United States Patent [19]

Smath

[11] Patent Number: 4,804,296

[45] Date of Patent: Feb. 14, 1989

[54] FLOTABLE AND ADJUSTABLE MARINE FENDER DEVICE

[76] Inventor: John R. Smath, 30 E. Grove Ave., Woodbridge, N.J. 07095

[21] Appl. No.: 62,970

[22] Filed: Jun. 17, 1987

[51] Int. Cl.$^4$ .............................................. E02B 3/22
[52] U.S. Cl. ..................................... 405/212; 405/213
[58] Field of Search ............... 405/212, 213, 214, 215; 114/219, 220

[56] References Cited

U.S. PATENT DOCUMENTS

| | | | |
|---|---|---|---|
| 2,844,943 | 7/1958 | Kennedy | 405/213 |
| 3,055,182 | 9/1962 | Slemmons | 405/215 |
| 3,486,342 | 12/1969 | Aks | 405/212 |
| 3,593,531 | 7/1971 | Saadeh | 405/212 |
| 4,437,793 | 3/1984 | Meny et al. | 405/212 |
| 4,657,116 | 4/1987 | Gardner et al. | 405/212 X |

Primary Examiner—David H. Corbin
Attorney, Agent, or Firm—Salvatore C. Mitri

[57] ABSTRACT

There is disclosed a flotable marine fender device having means to movably secure the device to a dock, piling or bulkhead so that the entire assemblage is free to rise and fall with flooding and ebbing tides enabling the marine fender to protect the sides or hulls of boats approaching, leaving or made fast to the docks, pilings or bulkheads.

10 Claims, 2 Drawing Sheets

FLOTABLE AND ADJUSTABLE MARINE FENDER DEVICE

BACKGROUND OF THE INVENTION

Most pleasure boats as well as larger, commercial vessels carry marine fenders on board. These marine fenders are generally cylindrically shaped and are typically put into use when a boat approaches, leaves or is made fast to a dock, piling or bulkhead. When put into use, they are normally dropped over the side of a boat and secured by a line made fast to a cleat on the boat's deck. Most times, the length of the line is adjusted so that the marine fender is vertically disposed alongside the boat's hull or side somewhere between the deck and the water line of the boat. Depending upon the size of the vessel, two or more marine fenders are positioned at spaced intervals along the length of the boat.

The purpose of using marine fenders is to protect the side or hull of the boat by preventing the boat from impacting or scraping against a dock, piling or bulkhead upon its approach or departure. When a boat is made fast to a dock, piling or bulkhead, these marine fenders are kept in place alongside the boat's hull or side to prevent the hull or side from scraping against the dock, piling or bulkhead as the boat rises and falls with flooding and ebbing tides or is pushed toward the dock, piling or bulkhead by the water's current or the wake of passing boats.

In order to be available for use, several marine fenders usually form part of a boat's standing inventory and they must be readied alongside the boat's hull or side in advance of the boat's approach to a dock, piling, or bulkhead. If a boat is crewed only by its captain, readying the marine fenders is an added burden. This burden can become a worrisome task when the single captain must also contend with other moving vessels, or a narrow channel, or brisk winds, or choppy waters, or a combination of all or any of these conditions.

GENERAL DESCRIPTION OF THE INVENTION

It has now been found that by using the flotable and adjustable marine fender device of the invention, the problems discussed above can either be eliminated or significantly reduced and minimized.

In general, the flotable and adjustable marine fender device of the invention comprises a flotable marine fender; means to movably secure the marine fender to a piling so that the marine fender is free to rise and fall with flooding and ebbing tides; and, means to maintain the marine fender in a substantially fixed position with respect to the piling.

Although the flotable marine fender can be of any shape, it is typically cylindrical and is disposed so that its longitudinal axis is substantially horizontal. In order to movably secure the flotable marine fender with respect to a piling, it is provided with a pair of legs, each of which is secured to an end of the flotable marine fender and each of which is equipped with means to removably receive a transverse connecting arm therebetween. The transverse connecting arm interconnects the legs which, together with the flotable marine fender, forms a rectangular assemblage which can be positioned to encircle a piling and be thus movably secured to it. Since the legs are equipped with means to removably receive transverse connecting arm therebetween the transverse connecting arm can be positioned toward or away from the flotable marine fender to accomodate different sizes and shapes of pilings. Adjusting the distance between the flotable marine fender and the transverse connecting arm also provides one way in which the flotable marine fender can be maintained in a relatively fixed position with respect to the piling.

Several flotable and adjustable marine fender devices of the invention can be movably secured to pilings supporting a dock or bulkhead and always be in position to prevent a boat's hull or side from impacting or scraping against a dock or bulkhead. By using and deploying the marine fender device of the invention in this way, pleasure boats and other vessels can reduce or eliminate their standing inventory of marine fenders. In addition, it will no longer be necessary to position and secure marine fenders alongside a boat or vessel as it approaches, departs or is made fast to a dock or bulkhead as the marine fender devices of the invention will already be in position to receive the boat's hull or side and protect it from damage by impacting or scraping against the dock or bulkhead.

Use of the marine fender device of the invention is not only more economical, but affords savings in time and effort as well.

DETAILED DESCRIPTION OF THE INVENTION

The flotable, and adjustable marine fender device of the invention will become more clear from the ensuing description when considered together with the accompanying drawing wherein like reference numerals denote like parts and wherein.

Figure 1:
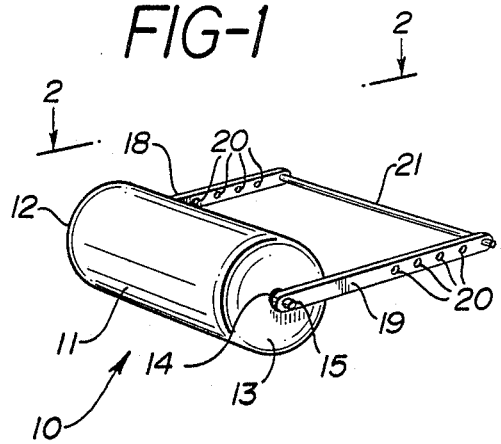
FIG. 1 is a perspective view of the marine fender device of the invention.
Figure 2:
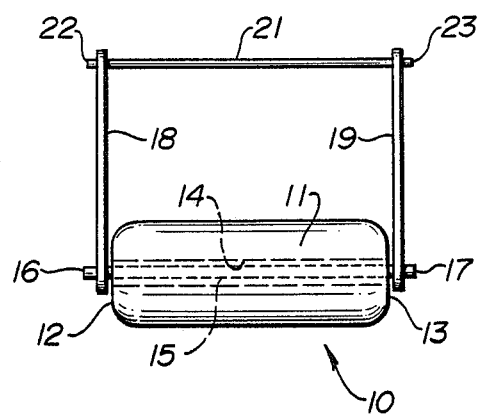
FIG. 2 is a top view of the marine fender device shown in FIG. 1 taken substantially on line 2—2 of FIG. 1.

As shown in FIGS. 1 and 2, the flotable, and adjustable marine fender device of the invention, generally identified by reference numeral 10, comprises a cylindrically shaped flotable marine fender 11 having generally rounded ends 12 and 13. A bore 14 is formed through the central, longitudinal axis of marine fender 11 through which an axle 15 is disposed, axle 15 being of a length so that its ends 16, 17 protrude beyond marine fender ends 12, 13.

The flotable marine fender 11 is typically manufactured from plastics or rubber materials or combinations thereof that are tough and durable (i.e., scuff and impact resistant) and which are resistant to fresh or salt water corrosion. These marine fenders can be constructed to be pneumatically inflated (i.e., air filled) or can be fabricated to have a foam filling that is covered with a tough and durable plastic or rubber coating bonded to the foam filling. Both of these types of marine fenders are commercially available.

The materials used to manufacture the flotable marine fender 11 are not critical provided that the marine fender that is produced floats in water and is preferably water proof so that it does not become water logged and eventually sink.

The diameter of the longitudinal bore 14 is sized to be slightly larger than the diameter of axle 15 so that marine fender 11 is free to rotate about axle 15 thereby minimizing wear and tear of the bore surface. Usually, a longitudinal bore 14 whose diameter is about 10% to 15% greater than the diameter of axle 15 is sufficient to provide free rotation of marine fender 11 about axle 15. A plastic or metal sleeve (not shown) can be seated in longitudinal bore 14, the inner diameter of the sleeve being sized to rotably receive axle 15 in the same manner as longitudinal bore 14 to further minimize wear and tear of the marine fender 11.

Protruding ends 16, 17 of axle 15 are respectively secured to opposed, parallel legs 18, 19 which, in the embodiment shown in FIG. 1, are each provided with a plurality of spaced apertures 20 to removably receive transverse connecting arm 21. Connecting arm 21 is of a size and length so that its ends 22, 23 can be inserted into and through apertures 20 with ends 22, 23 of arm 21 extending beyond legs 18, 19 respectively.

Although the number and spacing of apertures 20 are not critical, they are positioned and formed in legs 18, 19 so that each aperture in one leg is directly opposite a counterpart aperture in the other leg. In this way, when transverse connecting arm 21 is removably secured to legs 18, 19 through opposed apertures 20, a rectangular (or square) assemblage is formed by connecting arm 21, legs 18, 19 and marine fender 11.

The means used to removably secure connecting arm 21 are not critical and can be accomplished with conventional means well known to those skilled in the art. For example, ends 22, 23 of connecting arm 21 can be threaded to receive nuts and lock washers, or protruding ends 22, 23 can be provided with slots through their diameters to receive cotter pins, lock pins, and the like.

Since transverse connecting arm 21 is removably secured to legs 18, 19, the device can be readily disassembled to replace worn or damaged marine fenders 11. With this assemblage, transverse connecting arm 21 can also be positioned closer to or farther away from a marine fender 11 so that the marine fender device 10 can be movably secured and adjusted to accomodate different types and sizes of dock and/or bulkhead support pilings as illustrated in FIGS. 3–6.

Figure 3:
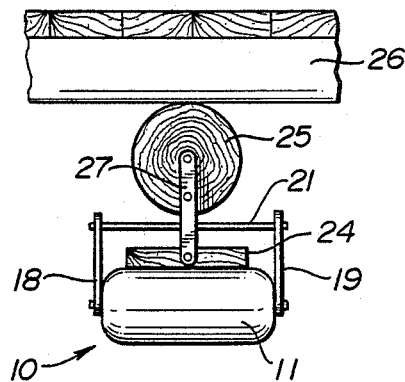
FIGS. 3-6 are top views with parts broken away for simplicity and clarity illustrating additional embodiments of the marine fender device of the invention and the manner in which the marine fender device can be flotably secured to different types and sizes of dock and/or bulkhead support pilings.

As shown in FIG. 3, the marine fender device 10 is flotably secured to a rectangular piling 24 which is spaced from cylindrical piling 25 which, in turn, provides part of the support for bulkhead 26. In the embodiment shown, rectangular piling 24 is secured to cylindrical piling 25 by means of connecting strap 27. The marine fender device 10 of the invention is positioned so that flotable marine fender 11, legs 18, 19 and tranverse connecting arm 21 encircle rectangular piling 24. Transverse connecting arm 21 is removably secured between legs 18, 19 through apertures 20 (see FIGS. 1 and 2) so that it is in close proximity to rectangular piling 24 yet sufficiently spaced from it to enable the entire assemblage comprising the marine fender device 10 to rise and fall with the rise and fall of flooding and ebbing tides while encircling and maintaining its position with respect to rectangular piling 24.

The spaced positioning of transverse connecting arm 21 with respect to rectangular piling 24 should also be such that the marine fender device assemblage is prevented from rotating about rectangular piling 24. In this way, flotable marine fender 11 is always disposed between rectangular piling 24 and the hull of a boat thereby protecting the hull from damage that might occur upon impact of the hull with the piling.

Figure 4:
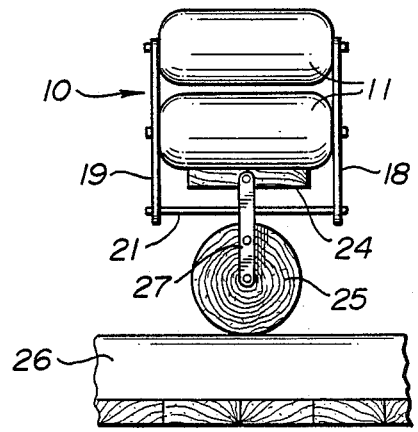

To accomodate and protect the hulls of larger vessels, such as large pleasure craft, as well as commercial tankers, freighters, and the like, a more substantial "cushioning" effect may be required. Under these circumstances, an assemblage such as shown in the embodiment of FIG. 4 can be employed. As can be seen in FIG. 4, the same assemblage is used as described for FIG. 3 above except that two flotable marine fenders 11 are tandemly placed in close proximity to each other between legs 18, 19. This permits the tandemly disposed marine fenders 11 to absorb greater impact forces that would be exerted by the hulls of larger vessels. Depending upon the size and weight of the ship hulls to be protected, several (e.g., 3, 5, 8, 10, etc.) marine fenders can be tandemly disposed in close proximity to each other to absorb hull impact and also protect the pilings, docks, or bulkheads to which the marine fender device assemblage is secured.

Figure 5:
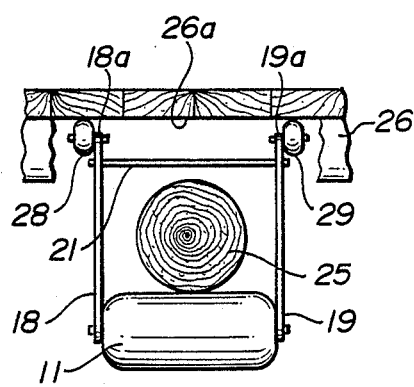

FIG. 5 illustrates a further embodiment of the marine fender device of the invention movably positioned to encircle a cylindrical piling 25. In the embodiment shown in FIG. 5, the same assemblage is used as described above for FIG. 3 except that the free ends 18a and 19a of legs 18 and 19 are secured to wheels 28, 29 by conventional means, such as convential pins or axles and securing pins or hubs (not shown), so that wheels 28, 29 are positioned to contact but are free to roll against the vertical side 26a of bulkhead 26. This assemblage permits the marine fender device to rise and fall with flooding and ebbing tides yet prevents the device from rotating about cylindrical piling 26 since wheels 28, 29 would interrupt any such rotational tendancy by their contact with piling wall 26a. As a result, the flotable marine fenders are maintained in a relatively fixed position with respect to the piling enabling them to receive the impact or scraping of ships' hulls or sides.

Figure 6:
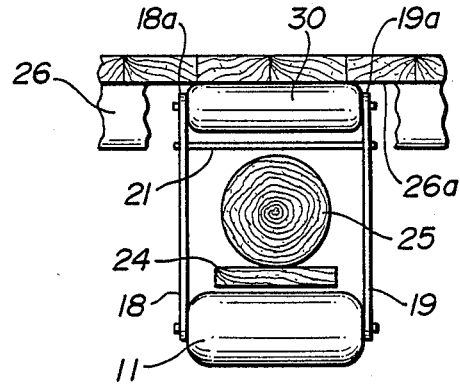

In FIG. 6, an alternate embodiment of that shown in FIG. 5 is illustrated. In the embodiment shown in FIG. 6, the wheels 28, 29 of the FIG. 5 embodiment are replaced with a roller 30 which is rotatably secured between legs 18, 19 adjacent their free ends 18a, 19a. Roller 30 can be rotatably secured between legs 18, 19 by the same or similar means as described above for rotatably securing marine fender 11 (See FIGS. 1 and 2). Roller 30 can also be another flotable marine fender rotatably secured between legs 18, 19 at the opposite end of legs 18, 19 to which flotable marine fender 11 is secured.

Although the embodiments illustrated in FIGS. 3–6 have been separately described, it will be obvious to those skilled in the art that various combinations of these embodiments can be assembled to accomodate different types, sizes and positions of pilings as well as different configurations of bulkheads and docks.

Figure 7:
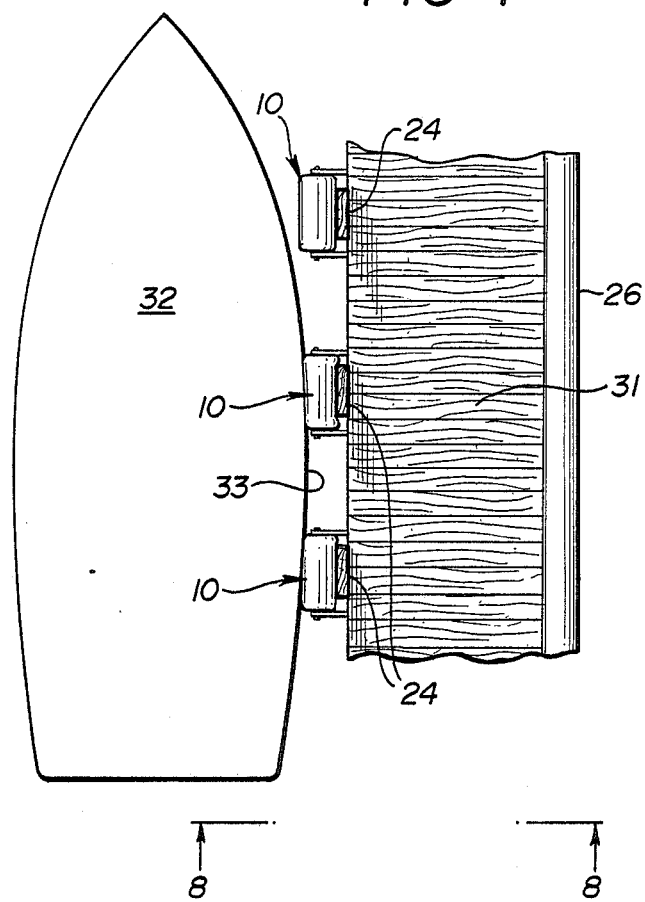
FIG. 7 is a plan view illustrating one example of how the marine fender device of the invention can be positioned with respect to a boat made fast to a dock; and, FIG. 8 is an end view taken substantially on line 8—8 of FIG. 7.
Figure 8:
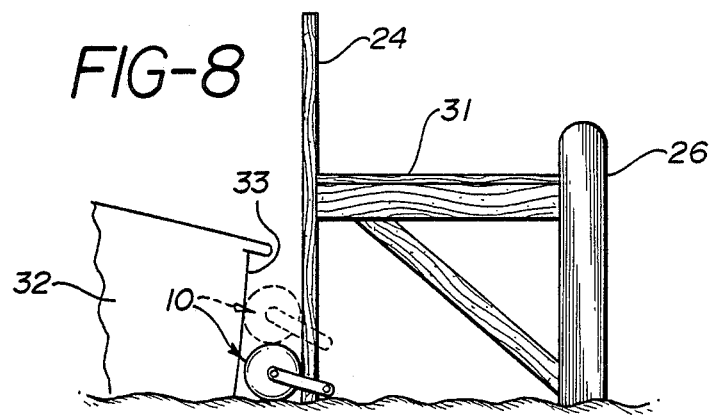

FIGS. 7 and 8 illustrate a typical deployment of the marine fender device of the invention with respect to a boat made fast to a dock. As can be seen in FIGS. 7 and 8, several marine fender devices 10 are flotably secured to rectangular pilings 24 which also support a dock 31 constructed between pilings 24 and bulkhead 26. Marine fender devices 10 prevent the hull or side 33 of boat 32 from contacting and impacting against pilings 24 and/or dock 31 as boat 32 approaches or leaves dock 31. Since the marine fender devices are flotably secured to pilings 24 and are free to rise and fall with flooding and ebbing tides, they also serve to protect the side or hull 33 of boat 32 as boat 32 rises and falls with flooding and ebbing tides during the time boat 32 is made fast alongside dock 31.

In order to accommodate the hulls or sides of larger vessels, a plurality of marine fender devices 10 can be movably secured to one or more pilings and stacked one on top of the other as illustrated by dotted lines in FIG. 8.

Although specific embodiments of the marine fender device of the invention have been described in some detail, it should be understood that changes and modifications can be made therein, as will become apparent to those skilled in the art, without departing from the scope and spirit of the invention.

What is claimed is:

1. A flotable and adjustable marine fender device comprising:
    a cylindrically shaped flotable marine fender;
    a pair of legs each of which is secured to opposite sides of said flotable marine fender and disposed substantially parallel to and opposite each other;
    a transverse connecting arm removably interconnecting said legs to each other intermediate their ends, said flotable marine fender, said legs and said transverse connecting arm together forming a rectangularly shaped assemblage enabling said marine fender device to encircle and maintain a substantially fixed position with respect to a piling to which said marine fender device is movably secured permitting said marine fender device to freely rise and fall with flooding and ebbing tides such that said flotable marine fender is capable of receiving the hull or side of a boat.

2. The marine fender device of claim 1 wherein said flotable marine fender has a bore formed through its central, longitudinal axis in which an axle is seated, the length of said axle being such that each of its ends extends beyond the ends of said flotable marine fender and are secured to each of said legs enabling said flotable marine fender to rotate about said axle.

3. The marine fender device of claim 1 wherein each of said legs has a plurality of spaced apertures formed therein to removably receive and secure said transverse connecting arm therebetween.

4. The marine fender device of claim 1 wherein the ends of said legs opposite said flotable marine fender each have a wheel rotatably mounted thereto.

5. The marine fender device of claim 1 wherein the ends of said legs opposite said flotable marine fender has a roller rotatably secured therebetween.

6. The marine fender device of claim 1 which includes a plurality of flotable marine fenders tandemly positioned in close proximity to each other between said legs.

7. A flotable and adjustable marine fender device comprising:
    a cylindrically shaped flotable marine fender having a bore formed through its central longitudinal axis;
    an axle seated in said bore, the length of said axle being such that each of its ends extends beyond the ends of said flotable marine fender;
    a pair of legs each of which has a plurality of spaced apertures formed therein and each of which is secured to an extended end of said axle, said legs being disposed substantially parallel to and opposite each other enabling said flotable marine fender to rotate about said axle; and,
    a transverse connecting arm removably interconnecting said legs to each other intermediate their ends through the apertures in said legs, said flotable marine fender, said legs and said transverse connecting arm together forming a rectangularly shaped assemblage enabling said marine fender device to encircle and maintain a substantially fixed position with respect to a piling to which said marine fender device is movably secured permitting said marine fender device to freely rise and fall with flooding and ebbing tides such that said flotable marine fender is capable of receiving the hull or side of a boat.

8. The marine fender device of claim 7 wherein the ends of said legs opposite said flotable marine fender each have a wheel rotatably mounted thereto.

9. The marine fender device of claim 7 wherein the ends of said legs opposite said flotable marine fender has a roller rotatably secured therebetween.

10. The marine fender device of claim 7 which includes a plurality of flotable marine fenders tandemly positioned in close proximity to each other.

* * * * *